United States Patent [19]
Boyle

[11] Patent Number: 6,073,116
[45] Date of Patent: Jun. 6, 2000

[54] CROSSFUND™ INVESTMENT PROCESS

[76] Inventor: John C. Boyle, 639 Denver Blvd., Edison, N.J. 08820

[21] Appl. No.: 08/814,724

[22] Filed: Mar. 7, 1997

[51] Int. Cl.⁷ .................................................... G06F 17/60
[52] U.S. Cl. ............................................................ 705/36
[58] Field of Search ................................. 705/36, 35, 37

[56] References Cited

U.S. PATENT DOCUMENTS

| | | | |
|---|---|---|---|
| 4,566,066 | 1/1986 | Towers ........................................ | 705/36 |
| 5,220,500 | 6/1993 | Baird et al. ................................ | 705/36 |
| 5,262,942 | 11/1993 | Earle .......................................... | 705/37 |
| 5,704,045 | 12/1997 | King et al. .................................. | 705/35 |
| 5,717,989 | 2/1998 | Tozzoli et al. .............................. | 705/37 |
| 5,930,762 | 7/1999 | Masch ......................................... | 705/7 |

OTHER PUBLICATIONS

Klopfenstein et al., "Ignoring Currency Volatility Can Prove Risky", Pensions & Investments, Nov. 10, 1997, pp. 43.

"Currency Converter Positions For E–Cash", Wall Street & Technology, Sep. 1996, pp. 62.

"Advent Launches Second Generation of Leading Portfolio Management System Axys; Integrated Multicurrency Accounting Now Available", PR Newswire, Feb. 13, 1996, pp. 213SFTU006.

Zewig et al., "Innocents Abroad", Forbes, Nov. 8, 1993, pp. 286.

Andrew J. Krieger, "Keep it Simple", Forbes, Nov. 9, 1992, pp. 332.

"Going International", Financial Services Week, Oct. 1, 1990, pp. 22.

*Primary Examiner*—Eric W. Stamber
*Assistant Examiner*—Jagdish N. Patel

[57] ABSTRACT

A process for investing in a mutual fund in an overseas portfolio without incurring an initial currency cost. The process is recorded by an exchange of rights to profit or loss of a domestic portfolio of securities with an exchange of rights to profit or loss of a overseas portfolio of securities. Time is a factor in the overseas ownership, and the process requires a fixed period, for example, ten years, for the rights exchange. When the rights exchange is reversed at a preset date in the future, the exchange allows the investor to return to the domestic securities portfolio. The return is done after computing the value of each domestic securities portfolio and the current market rate for currency exchange. The process allows the reversal to be done at the differential. Once the reversal is complete, the mutual fund is managed as a standard domestic mutual fund for the investor by the manager.

4 Claims, 4 Drawing Sheets

CROSSFUND™ INVESTMENT PROCESS

BACKGROUND OF THE INVENTION

There are approximately 9,000 mutual fund companies. These companies invest in approximately 50,000 United States Corporations that are traded on stock and bond exchanges and NASDAQ (National Association of Securities Dealers Automated Quotations) in America. In Europe. mutual fund companies are called UCITS (Uniform Collective Investments in Transferable Securities). These UCITS are not as developed as their United States counterparts, but they also buy and sell securities of corporations on stock and bond exchanges, e.g., Milan Exchange, Frankfuirt Exchange, Luxembourg Exchange. etc. An American investor may obtain international diversification by buying an international mutual fund, which then invests in companies that are traded on these overseas exchanges. A manager must convert 100% of the investment dollar to purchase securities on these exchanges at the time of initial investment, and then reconvert 100% of the securities value of the fund into the home currency at the time of sale by the investor. Hence, there is a major capital risk for currency fluctuation. In order to obtain international portfolio diversification, an investor has an expense of initial currency conversion with existing mutual funds.

SUMMARY OF THE INVENTION

The instant invention totally eliminates this currency conversion cost on the initial purchase of a Cross-Fund™ and strives to minimize this cost upon conversion back to a domestic currency. The figures illustrate flow charts documenting an exemplary process for investing in a mutual fund that allows international diversification with no initial currency exchange cost by exchanging the investor's rights to their portfolio's profit or loss over a fixed period with an overseas portfolio and then returning to the domestic portfolio at the differential. The return to the domestic currency is done at the differential amount between the portfolio's future respective values and future currency exchange rate. The manager (or managers) controls the securities investments in each market and computes daily the values for the portfolios and the currency exchange rate. After a fixed period of years, the reversal (boomerang™) returns the investor to ownership of the respective home portfolio, and the portfolio is then managed as a traditional mutual fund.

GLOSSARY OF TERMS

Manager(s) means any capital management company, firm, broker, dealer, bank, insurance company, consultant, advisor, individual or company that functions in a capacity to accept money or capital for investment in the United States of America or overseas country.

Official Currency Rate means the currency exchange rate or rate as reported in a major financial news publication in the United States of America. The symbol $ represents US dollars while the symbol € represents Euros. These are the examples used, and the Cross-Fund™ can be used with other currencies.

Window of Exchange Opportunity™(WEO) means a predetermined time period by the manager(s) who agrees to accept sales of funds whereby the funds are balanced or offset to lessen the cost of exchanging currency. The objective of the managers would be to charge only the differential between the value of the funds and the currency cost to the investors.

Boomerang™ means the final Window of Exchange Opportunity™. It is a predetermined date when the reversal of rights ownership occurs and an investor's ownership returns to the domestic portfolio. The calculation process is the same as the Window of Exchange Opportunity™.

Investor means any person, partnership, corporation or any entity committing money to the Cross-Fund™ to gain a financial return.

DETAILED DESCRIPTION OF THE PREFERRED EMBODIMENT

Figure 1:
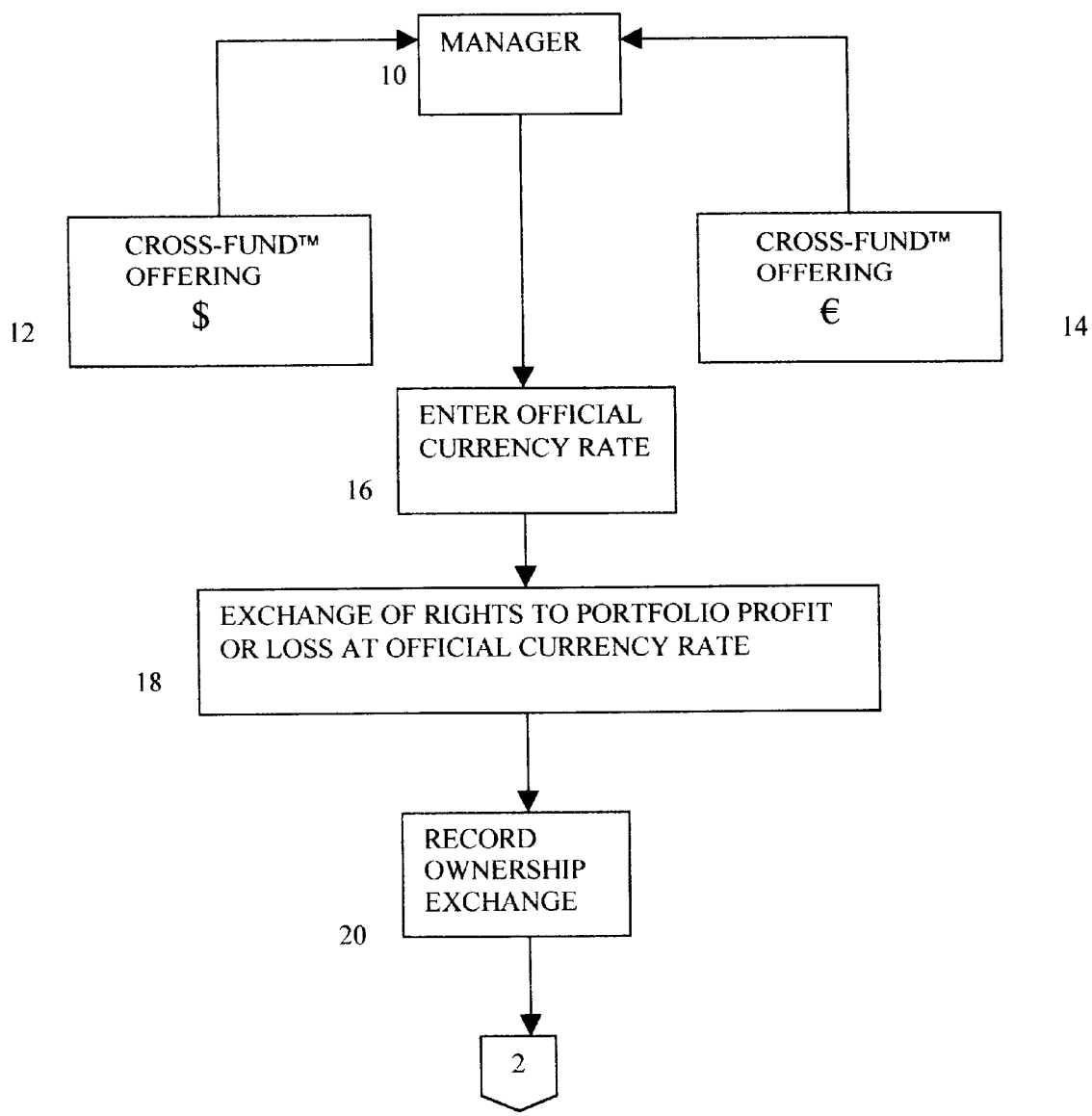
FIG. 1 illustrates the initial exchange of ownership rights to the portfolio at the official currency exchange rate.

FIG. 1 begins the exemplary process by a manager (or managers) at 10 who makes a simultaneous offering of Cross-Fund™ $ at 12 and Cross-Fund™ € at 14 in the respective markets. The currencies used are only representative, and the process can be done in any currency. The manager then obtains the official currency rate from an established publication, for example, The New York Times, at the close of the offering period as represented at 16. The manager records the exchange of rights to the profit and loss at this official currency exchange rate at 18. Each investor now owns the value of the portfolio in the overseas market, which is recorded by appropriate regulations, as represented at 20.

Thus, an investor in a Cross-Fund™ does not have to purchase any currency to invest overseas. and the manager has the domestic currency for purchasing securities in the home market.

Figure 2:
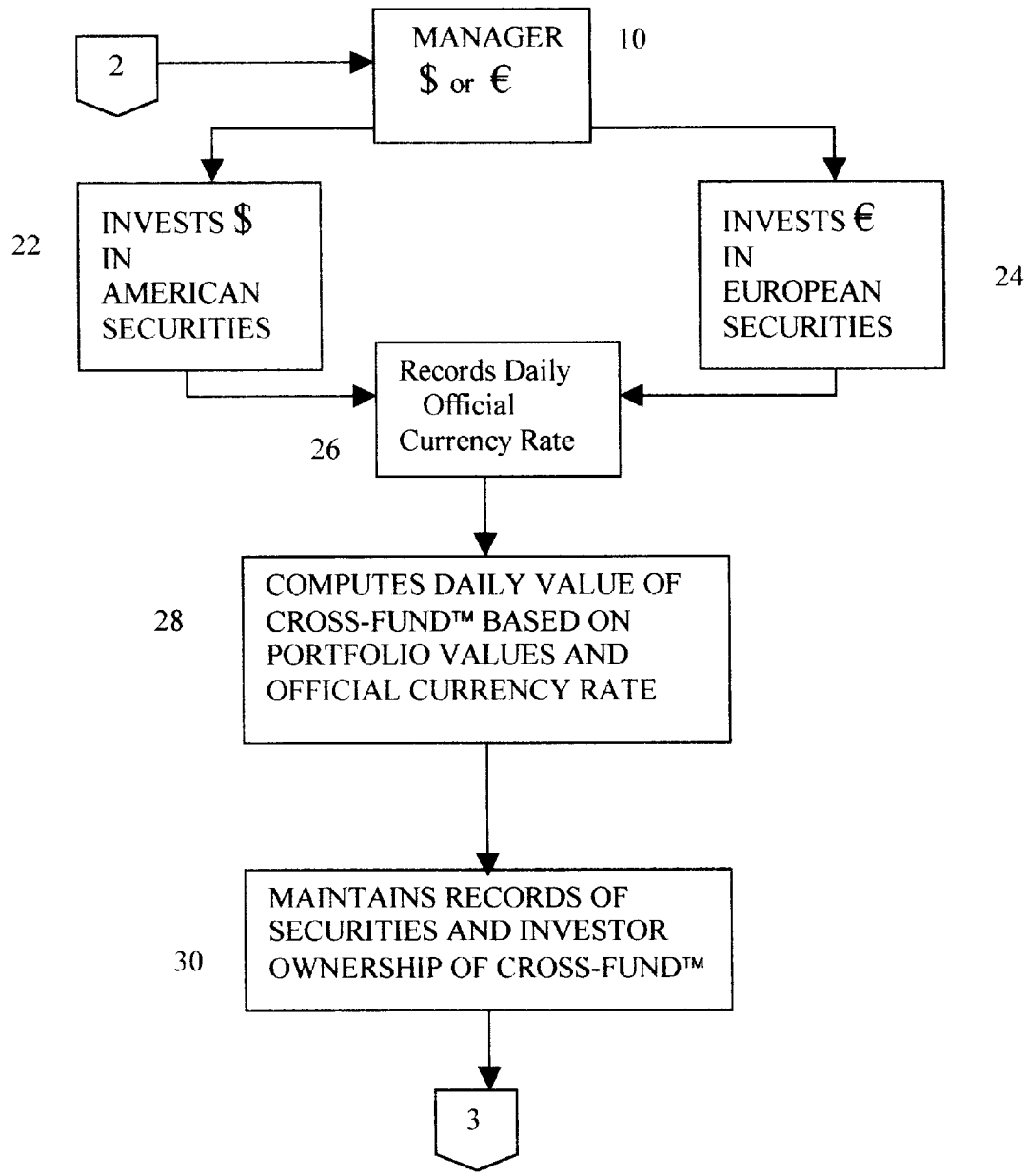
FIG. 2 illustrates the investment of the respective portfolios in the home market and the daily calculations to compute the Cross-Fund™ values.

FIG. 2 continues the process by the manager at 10 who invests the capital into the respective $ or € market. The manager can purchase either individual securities or an index. The S&P 500 index is one example of the purchase of securities in the $ market; the Frankfurt DAX index is one example of the purchase of European securities in the € market. Standard & Poor's Corporation provides information and details on indicies in America; Morgan Stanley Capital provides information and details on indicies in Europe. The figure illustrates the process by showing the manager 10 investing dollars at 22 and euros at 24. The manager records at 26 the official currency rate on a daily basis. The manager calculates the daily value of the Cross-Fund™, based on the performance of the individual portfolios and the official currency exchange rate, as shown at 28. The manager documents the ownership of the respective investments and the relative values to each investor, as indicated at 30.

Figure 3:
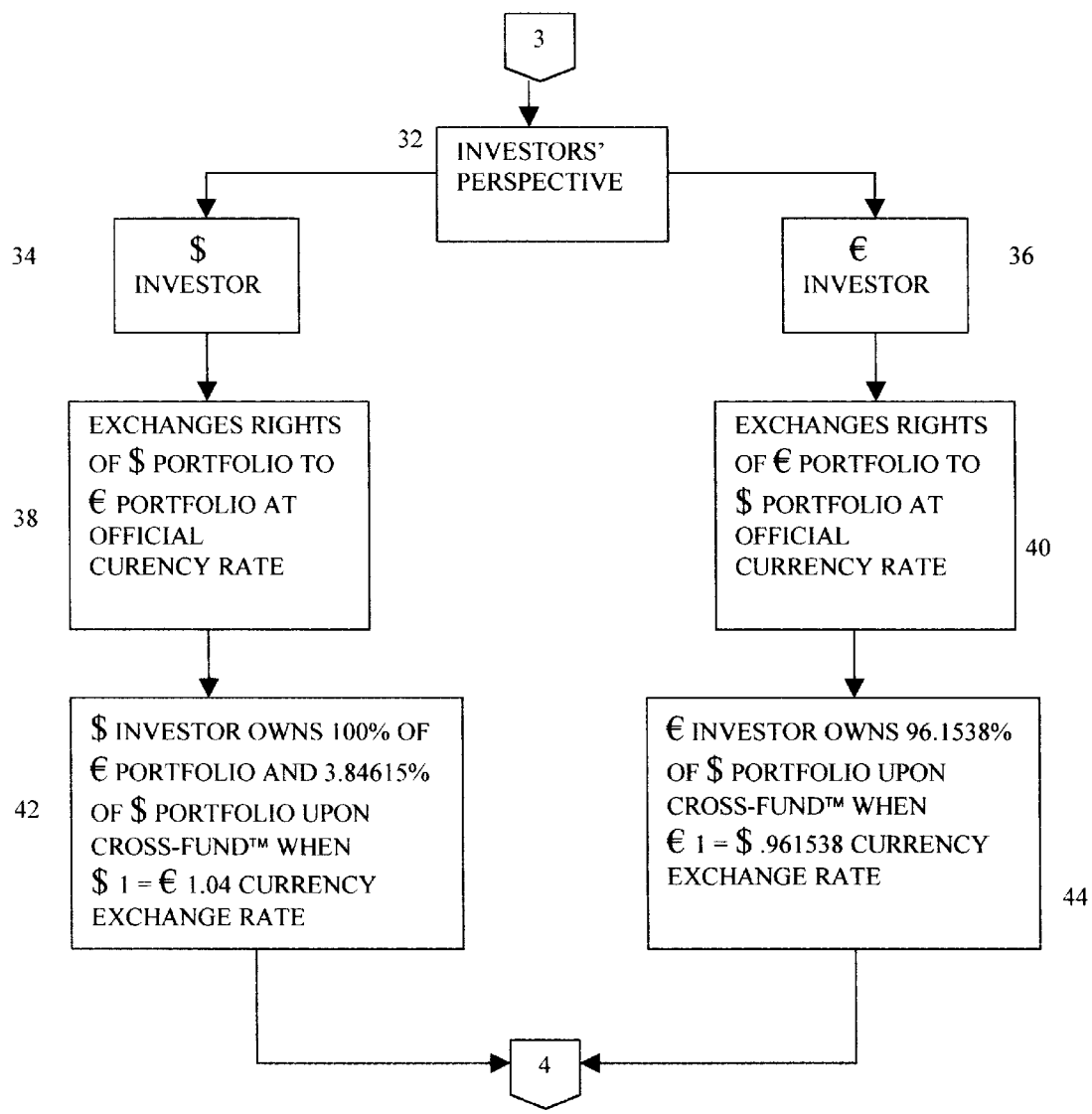
FIG. 3 illustrates the process from the perspective of the investor (at 32) for clarity.

In FIG. 3, the exemplary process is presented from the perspective of the individual investor. A $ investor at 34 agrees to exchange their rights to profit and loss of their $ portfolio with a € investor at 36 who agrees to rights exchange to profits and loss of their € portfolio (as recorded at 38 and 40). The exchange is done at the official currency exchange rate at the close of business of the dollar market, most likely at the close of the offering period of the Cross-Fund™. The process uses a currency exchange rate of 1 $ to €1.04 as an example to elucidate a real life trading possibility. With the exchange of rights at an official currency exchange rate of 1 $ to €1.04, the $ investor owns 100% of the € portfolio and 3.84615% of the $ portfolio at 42. Similarly, the € investor owns 96.1538% of the $ portfolio at 44. With these steps, the manager can calculate daily the values of a Cross-Fund™ from the perspective of the $ investor's percentage ownership of the two portfolios and the € investor's percentage ownership of the $ portfolio.

Figure 4:
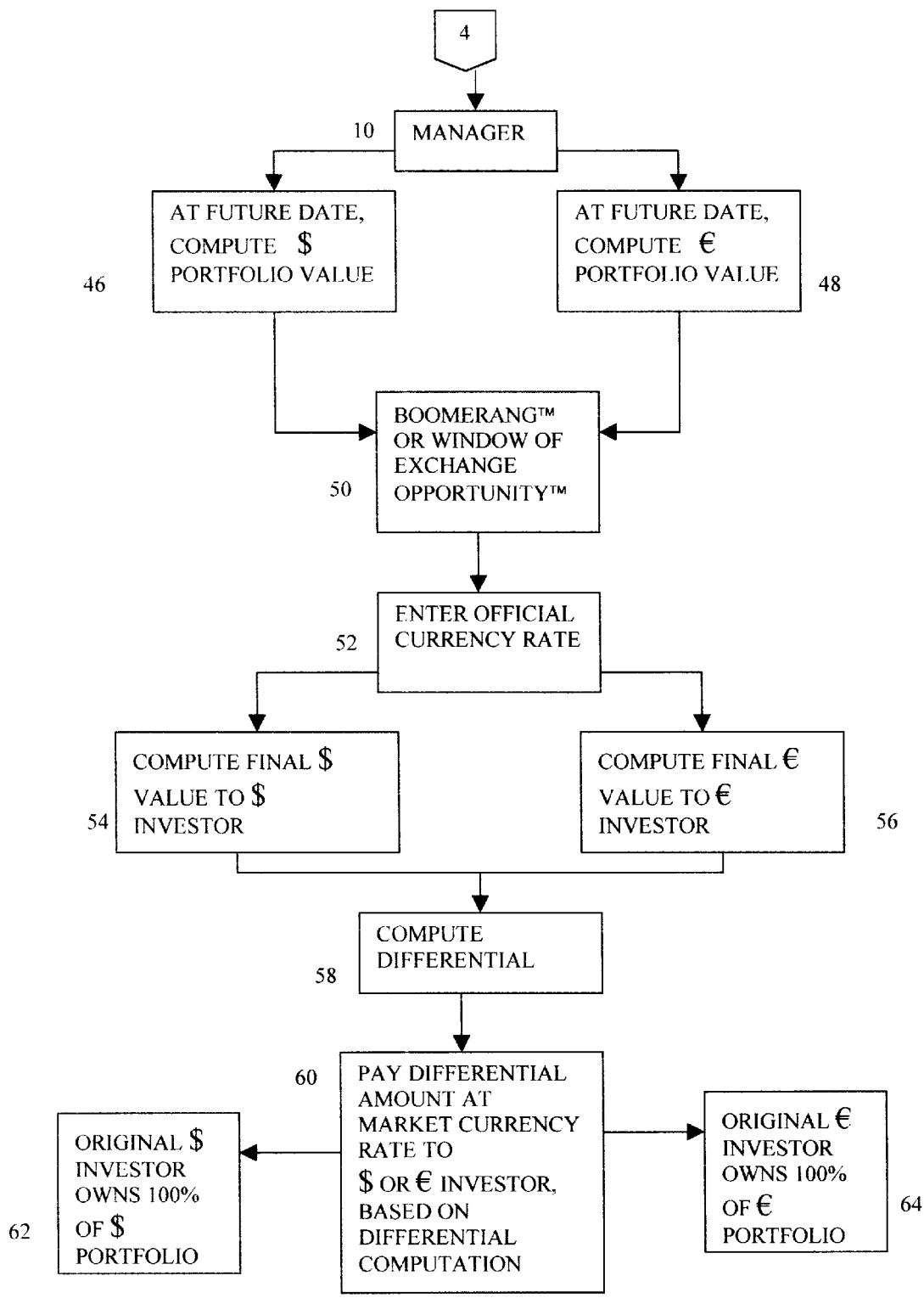
FIG. 4 illustrates the final steps to the process with the reversal and return to the respective domestic portfolios for the investors.

In FIG. 4, the flow chart illustrates the exemplary reversal process as done by the manager at 10. On a predetermined future date, for example, ten years, the manager records the $ portfolio value at the close of business at 46. Because of the time difference, the manager has already recorded the € portfolio value at the close of business at 48. On behalf of the investors, the manager is now ready to reverse the process, called a "boomerang™" or "window of exchange opportunity™", at 50. A "boomerang™" is the final exchange process, whereas a "window of exchange opportunity™" may be done to reverse the process at any time with agreement of all parties. The process of reversal is the same for both investors. The manager enters the official currency exchange rate at the close of business of the dollar at 52. The manager then computes the final value to the $ investor at 54. The manager then computes the final value to the € investor at 56. To typify with an example, if the exchange rate is 1 $ to 1 €, and the $ portfolio had a value of $2,000,000 per investor and the € portfolio had a value of €1,900,000, the $ investor would own $1,976,920 of the $ portfolio, based on the original ownership calculation shown in the example of FIG. 3, and the € investor would own €1,923,077, based on percentage ownership shown earlier in FIG. 3. Thus, the manager would compute the differential at 58. The manager would then go into the open market and buy euros to pay this positive differential to the €investor. As the exemplary process shows, this is the only time that the manager must purchase currency In the example, the manager would have to buy 23,077 euros. If necessary, the manager would sell securities in the American market to obtain cash to pay the differential. Once the differential is paid at 60, the ownership reverts back to the original investors. At 62, the original $ investor again owns 100% of the $ portfolio; at 64, the original € investor again owns 100% of the € portfolio.

The principal features and advantages are thus apparent from the steps in the above described flow charts over the present system of international investing by a mutual fund, and thus, it is intended that all such features and advantages of the instant invention fall within the true spirit and scope of the present invention for investing in a Cross-Fund™, a mutual fund with unique, novel and creative attributes. Modifications and variations will readily occur to those skilled in the art, and it is not desired that the present invention be limited to the exact construction and operation illustrated and described herein, for the flow charts lay out a process that can be easily followed to be inclusive to investing in a Cross-Fund™ international mutual fund, and those equivalents that may be resorted to are intended to fall within the scope of the claims. Given the level of complexity, a computer is inherently required. The complexity is such that the instant invention would be inoperative without a computer. This invention has been run using a Borland™ C++ program on a Windowsr™ operating environment.

What is claimed is:

1. A computer-implemented Cross-Fund portfolio investment method that enables investors to obtain an international mutual fund while eliminating initial currency conversion costs comprising the steps of:

making a simultaneous offering during an offering period of the Cross-Fund portfolio investment in two markets, one market being international with respect to the other;

setting a fixed investment period;

investing each investor's funds in a mutual fund in each investor's respective home market;

obtaining an official currency rate between the markets at the close of the offering period;

exchanging of rights to profit and loss for the fixed investment period between each investor's mutual fund at said official currency exchange rate; and recording the exchange of rights by appropriate regulation, wherein each investor now owns the value of the other investor's mutual fund in the international market.

2. The method of claim 1 further comprising the step of:

reversing the exchange of rights at the end of the fixed investment period or at any time with agreement of all investors, wherein the reversing step comprises the steps of:

obtaining an official currency rate between the markets;

computing a final value for each of investor's mutual fund based on the official currency rate;

determining the differential between the final values of the investor's mutual funds;

converting a positive differential into currency of the market with the positive differential based on the official currency rate; and paying the positive differential to the investor in the market with the positive differential.

3. A computer-implemented Cross-Fund portfolio investment system that enables investors to obtain an international mutual fund while eliminating initial currency conversion costs comprising the steps of:

means for making a simultaneous offering during an offering period of the Cross-Fund portfolio investment in two markets, one market being international with respect to the other;

means for setting a fixed investment period;

means for investing each investor's funds in a mutual fund in each investor's respective home market;

means for obtaining an official currency rate between the markets at the close of the offering period;

means for exchanging of rights to profit and loss for the fixed investment period between each investor's mutual fund at said official currency exchange rate; and means for recording the exchange of rights by appropriate regulation, wherein each investor now owns the value of the other investor's mutual fund in the international market.

4. The system of claim 3 further comprising:

means for reversing the exchange of rights at the end of the fixed investment period or at any time with agreement of all investors, wherein the means for reversing comprises:

means for obtaining an official currency rate between the markets;

means for computing a final value for each investor's mutual fund based on the official currency rate;

means for determining the differential between the final values of the investor's mutual funds;

means for converting a positive differential into currency of the market with the positive differential based on the official currency rate; and means for paying the positive differential to the investor in the market with the positive differential.

* * * * *